Patented Feb. 9, 1926.

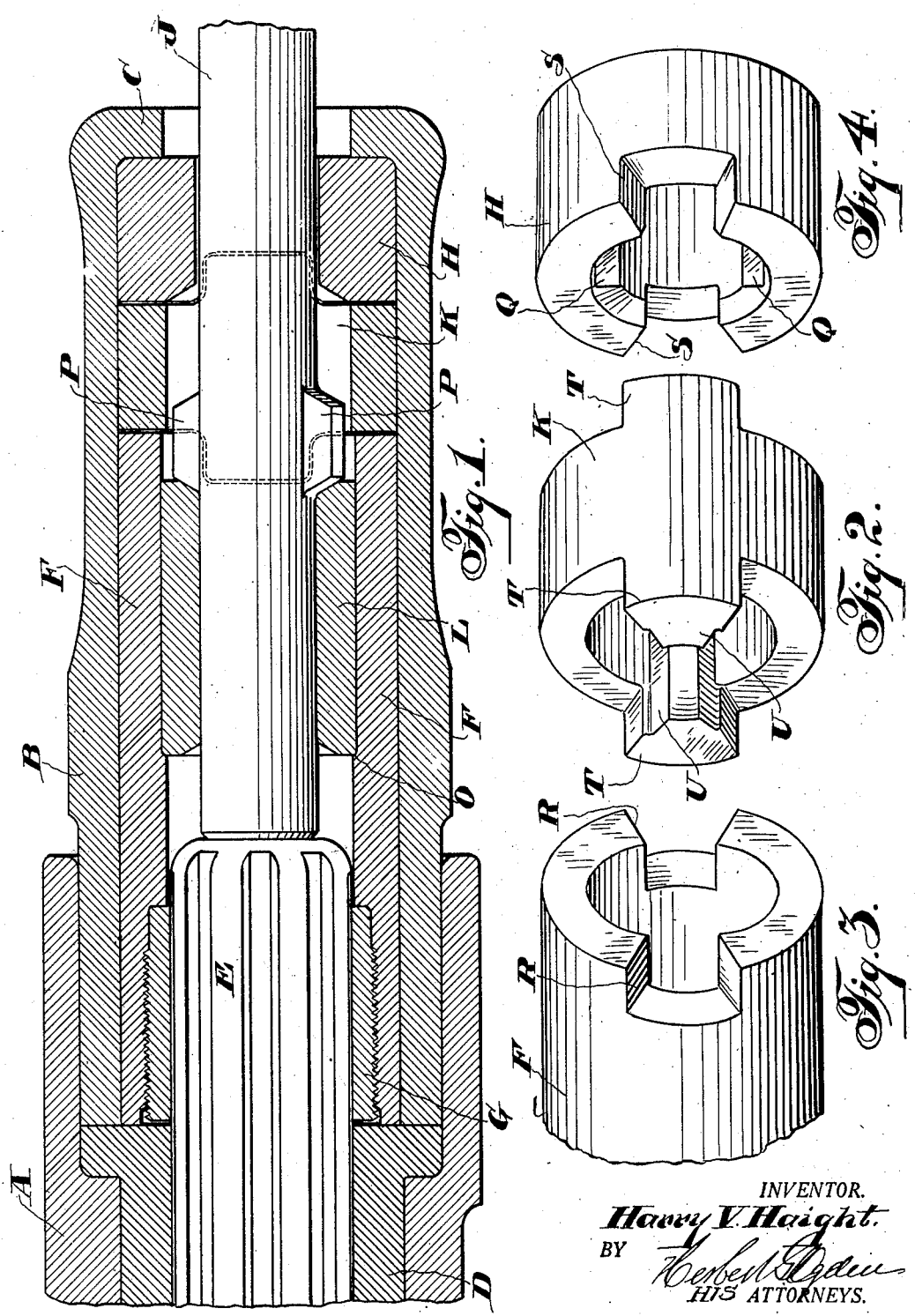

1,572,529

UNITED STATES PATENT OFFICE.

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

CHUCK ASSEMBLY FOR ROCK DRILLS.

Application filed January 22, 1925. Serial No. 3,905.

*To all whom it may concern:*

Be it known that I, HARRY V. HAIGHT, a citizen of the Dominion of Canada, and a resident of Sherbrooke, Province of Quebec, Canada, have invented a certain Chuck Assembly for Rock Drills, of which the following is a specification accompanied by drawings.

This invention relates to rock drills and more particularly to chuck assemblies for transmitting rotation to the drill steel.

One object of the invention is to enable the driver or element which engages the lugs of the drill steel to be made separate from the chuck or chuck key. Another object is to enable the driver to be reversed so as to present fresh wearing surfaces to the drill steel lugs. These objects are accomplished by constructing the driver separately from the chuck and chuck key and providing chuck jaws to engage the latter parts. Preferably, the chuck jaws are similar at the opposite ends so that the driver as it becomes worn on one surface may be reversed so as to present perfect faces to the lugs of the drill steel. Constructed in this manner, the driver may be formed from bar stock instead of being forged, and in addition is a cheaper renewable part partly because it is made of less material and partly because it can be used longer, being usable on both surfaces due to its reversible feature.

The invention will be more clearly understood by reference to the drawings which illustrate a preferred embodiment which the invention may assume in practice.

In the drawing in which similar reference characters refer to similar parts,

Figure 1 is a longitudinal view in section of the front end of a rock drill showing the front head and chuck assembly therewithin;

Figure 2 is a perspective view of the driver;

Figure 3 is a perspective view of the front end of the chuck, showing more particularly the manner in which the chuck is engaged by the driver; and Figure 4 is a perspective view of the chuck key for preventing the drill steel from disengaging the chuck.

Referring to the drawings, the forward part only of a rock drill is shown which includes the cylinder A to which is attached, in any suitable manner, the front head B having an inwardly extending flange C to retain the chuck assembly. The forward end of the cylinder A is sealed by means of a flanged front cylinder head D through which the fluted nose E of the hammer piston is adapted to reciprocate. The chuck assembly comprises a chuck F having a chuck nut G to cooperate with the fluted nose E of the piston, a chuck key H which is adapted to retain the lug steel J within the chuck, and a driver K is interposed between the chuck F and the chuck key H. The shank of the drill steel J is arranged to extend into the chuck F and into the path of the reciprocating piston E to receive the blows therefrom. The chuck bushing L is provided to guide the shank of the drill steel J and to prevent the steel from extending beyond a predetermined point into the chuck. The chuck bushing L is therefore press fitted into the chuck F and is seated against a shoulder O formed on the interior surface of the chuck. The lugs P, being larger than the internal bore of the bushing L, prevent the steel from extending too far into the chuck F.

The chuck key H is provided with grooves or ways Q to permit the lugs P to pass through the key H, but, owing to their narrow width, normally prevent the steel from being pulled out except when the lugs P register with these grooves.

It is desirable to maintain simultaneous rotation of the chuck F, the driver K and the chuck key H and therefore chuck jaws R and S are provided on the chuck F and the chuck key H respectively to engage with longitudinally extending teeth or jaws T on the driver K. The driver K is provided with means to engage the lugs P of the steel J and to this end there are formed longitudinal ribs U internally on the driver K. The ribs U are subjected to grinding and wear from the lugs P and wear out relatively soon as compared with the other parts of the chuck assembly. For this reason, the driver K is made separate from the chuck F and the chuck key H. It may thus be replaced without the necessity of replacing the other parts of the chuck assembly. In addition to this feature the driver K is made reversible and to this end the teeth or jaws T are similar on the opposite ends of the driver K. The driver K can thus be turned to present a fresh surface for wear on the other side.

In order that the driver K may be made of the least material, the ribs U are arranged to extend in line with the teeth or jaws T and therefore are longer than the main body of the driver K. The greatest possible length of the ribs U is thus provided. Normally, only one surface of the ribs U is worn since there is ordinarily some space left within the driver K to permit the steel J to move longitudinally, therefore, when the driver K constructed as above described is reversed, the worn ends of the ribs U are placed at the front end where they will no longer receive wear and the unworn surfaces then are placed in position to engage the lugs P. Due to this arrangement of the ribs U, the clutch jaws or teeth T are strengthened materially and breakage is prevented.

I claim:

1. A chuck assembly for a rock drill comprising a chuck, a chuck bushing within the chuck to receive the shank of a drill steel, a chuck key having grooves to permit lugs on the drill steel to enter, and a reversible driver interposed between the chuck and chuck key provided with means to engage the lugs on the drill steel, said chuck and chuck key being provided with clutch members and the intermediate driver having co-operating clutch members to transmit rotation from the chuck to the driver and chuck key.

2. A chuck assembly for a rock drill comprising a chuck having clutch members, a chuck bushing within the chuck to receive the shank of a drill steel, a chuck key having grooves to permit lugs on the drill steel to enter and also having clutch members, a reversible driver interposed between the chuck and chuck key having similar clutch members similarly placed at its ends to engage the clutch members of the chuck key and chuck, and longitudinal ribs within the driver in line with the clutch members to engage the drill steel lugs.

3. A chuck assembly for a rock drill comprising a chuck, a chuck bushing within the chuck to receive the shank of a drill steel, a chuck key having grooves to permit lugs on the drill steel to enter and having clutch members, a reversible driver interposed between the chuck and chuck key having similar clutch members similarly placed at its ends to engage the chuck key and chuck, and longitudinal ribs extending the length of the driver and the clutch members to engage the lugs of the drill steel.

In testimony whereof I have signed this specification.

HARRY V. HAIGHT.